United States Patent
Rodriguez

(10) Patent No.: US 6,237,533 B1
(45) Date of Patent: May 29, 2001

(54) PET CLEAN-UP APPARATUS AND METHOD

(76) Inventor: Carol Rodriguez, 1300 Iroquois Pl., Ann Arbor, MI (US) 48104

( * ) Notice: Subject to any disclaimer, the term of this patent is extended or adjusted under 35 U.S.C. 154(b) by 0 days.

(21) Appl. No.: 09/371,253

(22) Filed: Aug. 10, 1999

Related U.S. Application Data

(60) Provisional application No. 60/115,665, filed on Jan. 13, 1999.

(51) Int. Cl.⁷ .............................. A01K 29/00; A45C 15/00
(52) U.S. Cl. ........................... 119/161; 119/867; 294/1.3; 150/107; 150/112
(58) Field of Search ..................... 119/161, 867, 119/868, 869, 858; 294/1.3; 150/100, 103, 104, 106, 107, 112, 108, 109

(56) References Cited

U.S. PATENT DOCUMENTS

| | | | |
|---|---|---|---|
| 1,485,172 | * | 2/1924 | Dowell . |
| 4,566,130 | * | 1/1986 | Coates ..................................... 383/15 |
| 4,739,809 | * | 4/1988 | Adams ................................. 150/112 |
| 4,854,732 | * | 8/1989 | Italici ........................................ 383/6 |
| 4,893,739 | | 1/1990 | Conner ................................. 224/240 |
| 4,895,198 | * | 1/1990 | Samuelson ........................... 150/138 |
| 4,998,653 | | 3/1991 | LaBelle ................................ 224/151 |
| 5,002,401 | * | 3/1991 | Blackman ............................... 383/38 |
| 5,022,528 | * | 6/1991 | Savoy ..................................... 206/545 |
| 5,233,942 | | 8/1993 | Cooper et al. ........................ 119/792 |
| 5,288,150 | * | 2/1994 | Bearman ................................. 383/38 |
| 5,350,045 | * | 9/1994 | Robertson ............................ 190/110 |
| 5,441,017 | | 8/1995 | Lindsay ................................ 119/795 |
| 5,560,321 | | 10/1996 | Hess ..................................... 119/858 |
| 5,713,616 | * | 2/1998 | Knudson ................................ 294/1.3 |
| 5,718,192 | | 2/1998 | Sebastian ............................. 119/795 |
| 5,727,500 | * | 3/1998 | Conboy ................................ 119/174 |
| 5,813,445 | * | 9/1998 | Christman ............................ 150/106 |
| 6,019,067 | * | 2/2000 | Carey ................................... 119/795 |
| 6,073,590 | * | 6/2000 | Polding ................................ 119/795 |
| 6,085,695 | * | 7/2000 | Miller et al. .......................... 119/795 |

* cited by examiner

Primary Examiner—Charles T. Jordan
Assistant Examiner—Yvonne R. Abbott
(74) Attorney, Agent, or Firm—Gifford, Krass, Groh, Sprinkle, Anderson & Citkowski, PC

(57) ABSTRACT

Apparatus is disclosed for discreet and convenient clean up of pet waste wherein the user can carry fresh, unused bags for pet waste in one compartment, and filled waste bags in another. The invention is configured for independent use, or for use with a pet leash. A strap is provided, which functions to close the main compartment of the apparatus and to attach the apparatus to a pet leash. A handle strap is also provided for ease of carrying the apparatus by hand.

5 Claims, 1 Drawing Sheet

PET CLEAN-UP APPARATUS AND METHOD

REFERENCE TO RELATED APPLICATION

This application claims priority from U.S. provisional patent application Ser. No. 60/115,665, filed Jan. 13, 1999, the entire contents of which are incorporated herein by reference.

FIELD OF THE INVENTION

The present invention relates generally to methods and apparatus for cleaning up pet waste. More particularly, the invention relates to a convenient, discreet, simple system for pet waste clean up by a pet owner.

BACKGROUND OF THE INVENTION

Quite often pet owners, dog owners in particular, walk their pets. Recently, many communities have enacted ordinances requiring that the owners clean up after their pets. It is a common practice for owners to carry plastic bags with them while they walk their pets, fill the bags with the pet's waste, and then carry the unsightly, inconvenient plastic bag until the owner has an opportunity to dispose of it. This also results in an unpleasant visual effect. The present invention solves these problems in a unique fashion.

SUMMARY OF THE INVENTION

The present invention provides a solution to the aforementioned problems. The preferred embodiment is a bag with two compartments one inner compartment and one outer compartment. The pet owner can store clean, unused plastic bags in the outer compartment. The inner compartment is designed to receive the plastic bags filled with pet waste, so that the owner can carry them in a more convenient, dignified fashion until he or she has an opportunity to dispose of them properly.

The preferred embodiment is configured for use by itself, or in conjunction with a pet leash. The ability to use the bag in conjunction with a pet leash affords the pet owner additional advantages. For example, the pet owner can easily remember to take the bag along each time the pet is walked, as the bag will be attached to the leash. Also, attaching the bag to the pet leash allows the owner to maintain a free hand, thus making it easier to open doors, gates, and so forth.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF THE INVENTION

Figure 1:
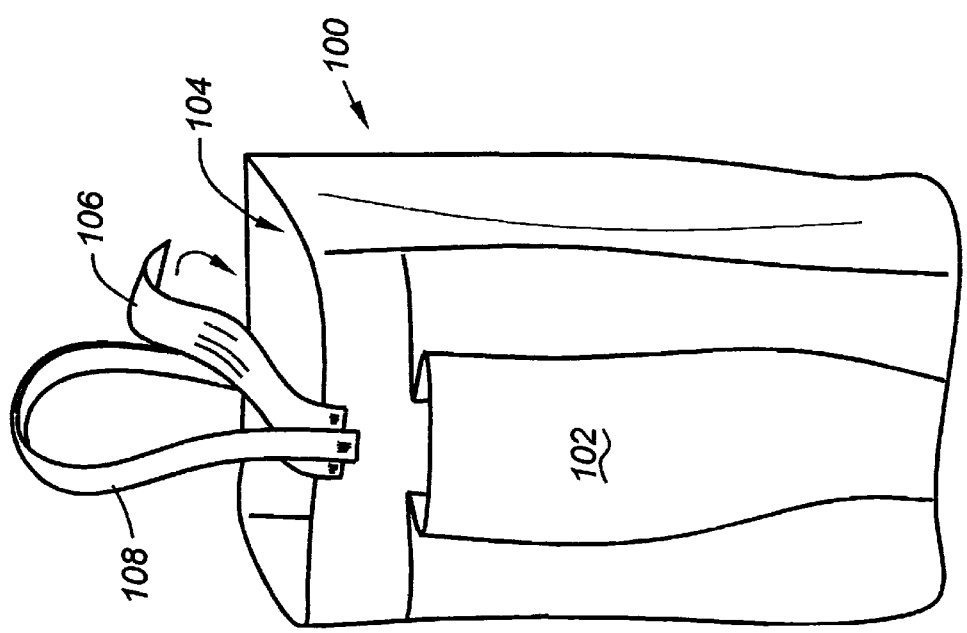
FIG. 1 is a front, three-quarter perspective view of the preferred embodiment of the invention.

The preferred embodiment of the invention is shown in FIG. 1. FIG. 1 illustrates a cloth or fabric-like bag 100, preferably having two compartments, an outer compartment 102 and an inner compartment area 104. The compartment area 104 further includes a strap 106 preferably including a hook-and-a-loop fastener which attaches to opposite sides (not visible in the figure), as well as a carrying handle 108, as shown.

The outer side pocket 102 is preferably used to carry plastic bags for pet clean-up. The filled bags may then be placed in the other portion of the bag 104 which then may be closed with a strap 106.

Figure 2:
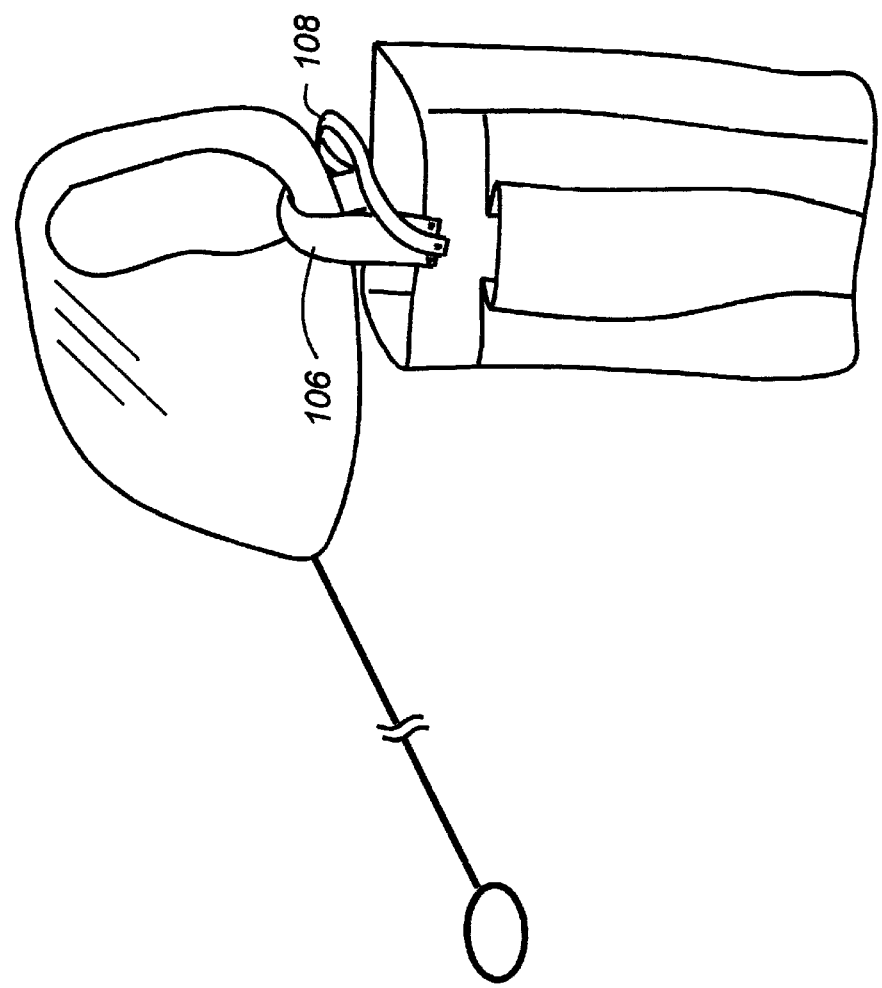
FIG. 2 illustrates the preferred embodiment of the present invention as attached to the handle portion of a retractable pet leash.

The strap 106 is such that it may be looped over any kind of retractable or flexible leash as shown in FIG. 2. The device also works with straight leashes of any kind. The handle 108 is used for carrying with strap 106 closed, even if not attached to a leash.

Other embodiments of the invention preferably utilize alternative materials, at least for the side pouch 102. For example, the side pouch 102 can be made of a clear or opaque fabric. In the preferred embodiment, the inside of the compartment 104 is also lined with a waterproof material, such as solid plastic, so as to avoid any staining or leakage produced by the contents of the filled plastic bags stored in compartment 104.

The invention may be manufactured to include visual indicia, which can either be commercially purchased or custom made. Such indicia may consist of a pet motif, or alternatively, may incorporate a photograph of an owners' pet, or a pet's name, as through embroidery.

The method of using the device consists of removing unused, fresh plastic bags from side pouch 102, filling them with pet waste, and depositing the filled plastic bags into main compartment 104. The main compartment 104, would then be closed by the strap 106, so as to provide the pet owner a neat, convenient method of cleaning up after his pet.

Additional embodiments will become apparent to those skilled in the arts to which it pertains without deviating from the scope from the appended claims. The claims, figures, and detailed descriptions of the invention are illustrative of a particular embodiment, but should not be considered as limiting other embodiments, which may be resorted to without departing from the invention. Thus, the detailed description and the figures above should not be construed as limiting the scope of the invention.

I claim:

1. A system for the collection of waste from a pet tethered by a leash, comprising:

a primary bag-shaped compartment having an outer surface with a plurality of side panels for accepting plastic bags containing pet waste;

a second compartment attached to said primary bag-shaped compartment for storage of unused plastic pet waste collection bags;

a strap for closing said compartment, said strap having a first end attached to one of said side panels of said primary bag-shaped compartment and a second end which includes fastening means for attachment to another one of said side panels;

a carrying strap with two ends, both of which are attached to said primary bag-shaped compartment; and pet-related visual indicia imprinted on at least said primary bag-shaped compartment.

2. The system of claim 1, wherein said fastening means of said sealing strap comprises a hook-and-loop fastener.

3. The system of claim 1, wherein said sealing strap can be looped over said leash.

4. The system of claim 1, wherein said secondary compartment is constructed of a clear material.

5. The system of claim 1, wherein said outer surface is constructed of a cloth or fabric-like material.

* * * * *